Oct. 28, 1941.  A. RAPPL  2,260,868
PUMP FOR ACCESSORY SYSTEMS
Filed July 23, 1938  2 Sheets-Sheet 1
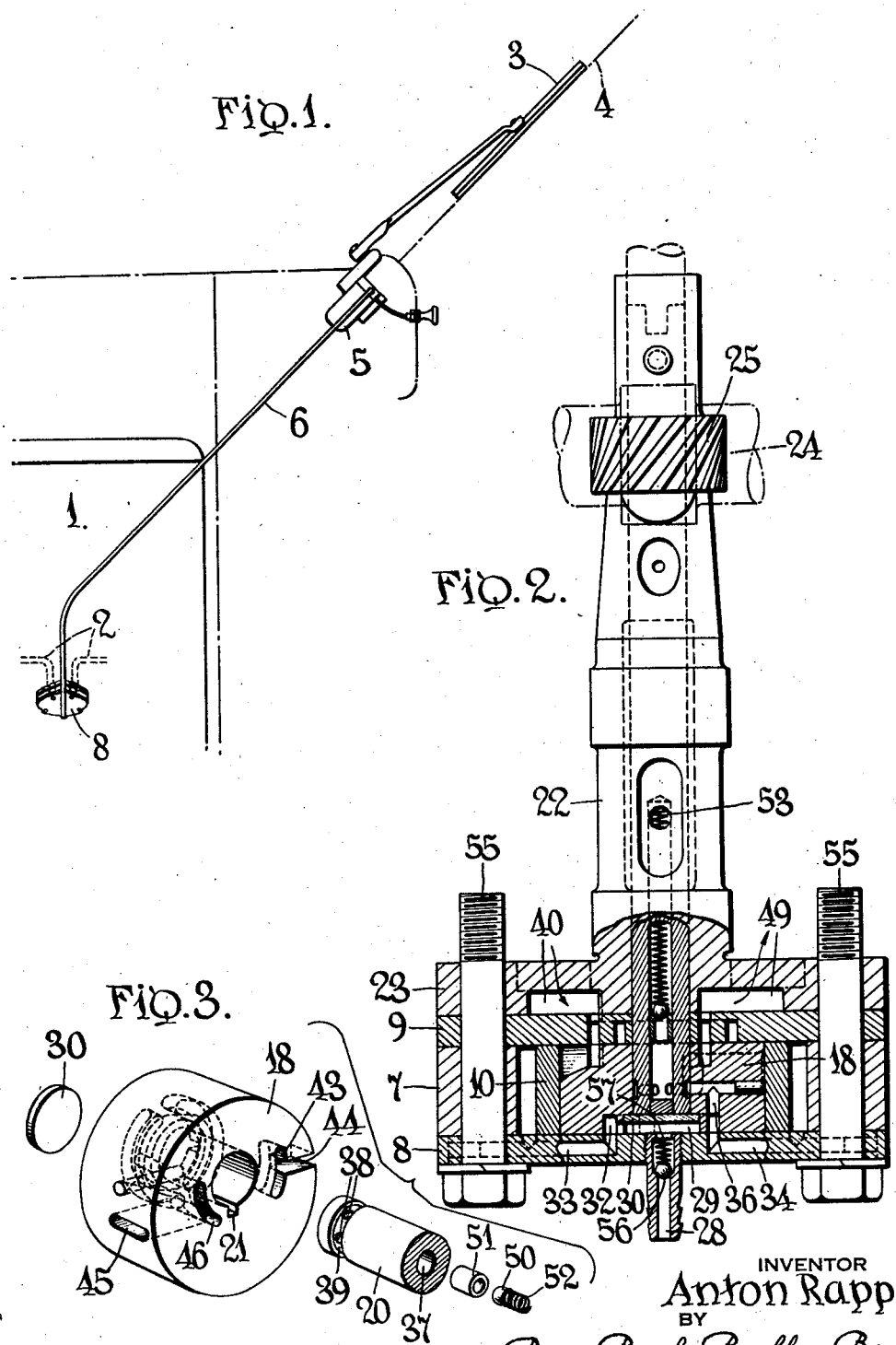
INVENTOR
Anton Rappl,
BY
Beau, Brooks, Buckley & Beau.
ATTORNEYS Oct. 28, 1941.  A. RAPPL  2,260,868
PUMP FOR ACCESSORY SYSTEMS
Filed July 23, 1938  2 Sheets-Sheet 2

INVENTOR
Anton Rappl,
BY
Beau, Brooks, Buckley + Beau.
ATTORNEYS

Patented Oct. 28, 1941

2,260,868

UNITED STATES PATENT OFFICE 2,260,868

PUMP FOR ACCESSORY SYSTEMS

Anton Rappl, Eggertsville, N. Y., assignor to Trico Products Corporation, Buffalo, N. Y.

Application July 23, 1938, Serial No. 220,939

6 Claims. (Cl. 103—4)

This invention relates to motor vehicles and has for its primary aim to incorporate the accessory system of a motor vehicle in its power plant in such an intimate manner as to render the accessory system a vital part of the power plant.

In one phase, the invention comprehends the combining of the oil pump of the engine with the source of fluid pressure for the accessory to insure mutuality in operation and resulting in compactness and simplicity of installation.

The invention further resides in the salient features of construction and their novel combinations, as will be more fully set forth hereinafter, reference being had to the accompanying drawings wherein Fig. 1 is a diagrammatic view of a motor vehicle illustrating the embodiment of the present invention therein;

Fig. 2 is a sectional view through the combined pump;

Fig. 3 is an exploded perspective view depicting the driving piston;

Figure 4:
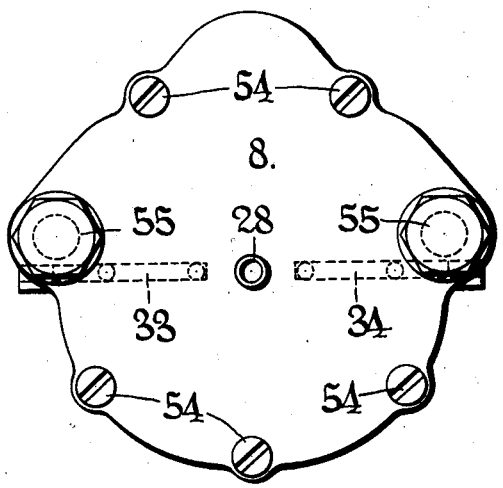
Fig. 4 is an elevation of the combined pump.
Figure 5:
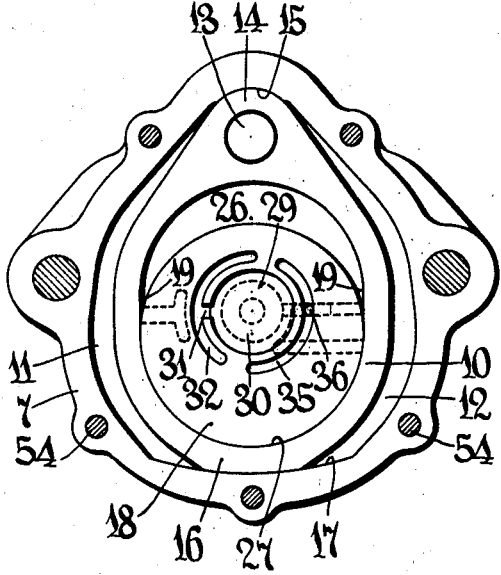
Fig. 5 is a similar view with the cover plate removed.
Figure 6:
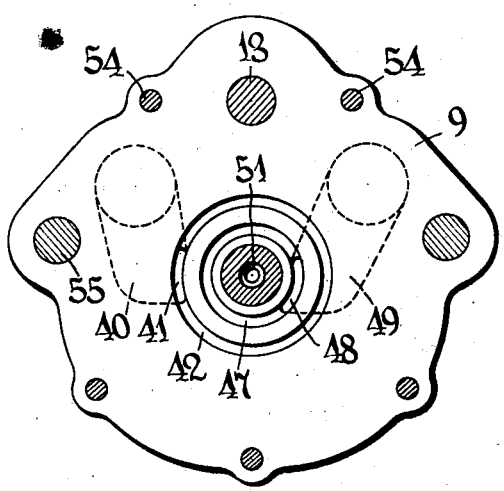
Fig. 6 is a like view showing the back plate with the working parts of the pump interior removed.
Figure 7:
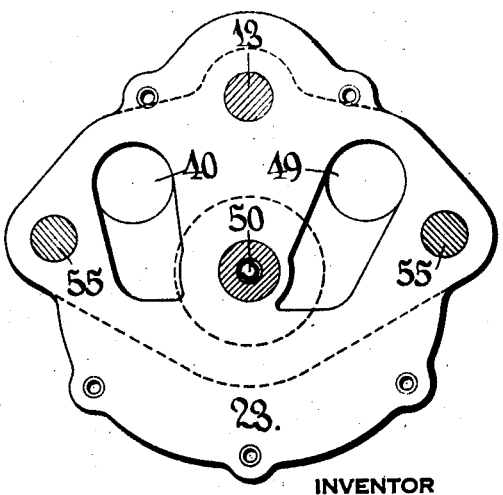
Fig. 7 depicts the mounting plate for the combined pump.

Referring more particularly to the drawings, the numeral 1 designates the vehicle engine having a lubricating system, the inlet and outlet oil passages of which are indicated at 2. The accessory system illustrated comprises a wiper 3 movable on the windshield 4 by a fluid operated motor 5 connected to the source of fluid pressure by a conduit 6.

The novel pump unit comprising the rotatable piston operating in a dual capacity, first to displace fluid and secondly to impart fluid displacing movement to a second piston in its broad aspect, forms the subject matter of an earlier application filed by me under date of July 19, 1938, Serial No. 219,965.

The combined pump, forming a part of this invention, utilizes the broad inventive concept of the earlier application for the combined pumping of gaseous and liquid fluids and may constitute a source of pressure for both the lubricating or other liquid system of the vehicle power plant and the accessory system. It comprises an air pump unit and a liquid pumping unit, the former having a casing 7 with a cover plate 8 and a back plate 9, all enclosing a compartment which is divided by a piston 10 into chambers 11 and 12. The plates 8 and 9 constitute end walls for the compartment and chambers and are slidably engaged by the piston which latter preferably has pivotal mounting on a pin 13 for swinging after the fashion of a vane. The vane piston body has its inner end 14 shaped concentrically about the pivotal axis 13 for sliding contact on the arcuate wall of a likely contoured recess 15, while the outer end 16 is shaped on an arc struck about the pivotal axis for sliding contact with a similar arcuate surface 17 on the casing wall. The front and back faces of the vane conform generally to the opposing interior walls of chambers 11 and 12 for a more complete evacuation of the air content.

The liquid pumping unit has a rotative piston 18 operating against the opposed side flat walls 19 of a compartment formed in the vane piston 10. This piston is eccentrically fixed on a drive shaft 20 as by a key fitting in the key way 21, and the shaft is journaled in a bearing extension 22 from the mounting plate 23 and derives its power from some suitable part of the power plant, such as the cam shaft 24, to which it is connected by gearing 25. By reason of its eccentricity the piston 18 not only moves into and out of the opposing chambers 26 and 27, comprising the ends of the vane carried compartment, to alternately ensmall and enlarge the chambers for a liquid displacing operation but also to constitute a cam or crank for oscillating the vane piston. The spacing of the side walls 19 is substantially equal to the diameter of the piston which is preferably cylindrical in cross section. Therefore, this rotative piston has sliding contact or engagement with the side walls as well as with the end walls 8 and 9 of the casing so as to seal the opposing chambers for liquid displacement. This sliding engagement is maintained throughout the cycle of operation and serves to control the movement of the vane throughout and against independent or lost motion.

The casing is provided with the necessary inlet and outlet ports for both the gaseous as well as the incompressible fluids. For the air intake the cover plate 8 is provided with a nipple 28 to which the conduit 6 is attached and which opens into an inlet recess 29 formed in the piston 18 coincident with the axis of rotation. To facilitate manufacture the recess 29 is counterbored in the formation of the shaft receiving opening and is blocked therefrom by a closure disk 30. The air flow is from the inlet recess through a notch 31, formed in the wall thereof, into a concentrically provided arcuate groove 32 which, during rotation of the piston, communicates successively with the transfer passages 33 and 34 of the cover plate. These transfer passages are for the purpose of establishing communication with the chambers 11 and 12 and in this embodiment serve both for the inflow and the outflow of air. To exhaust these chambers the rotative piston is provided with a second facial groove 35 having the same radius as groove 32 for wiping over the ported terminals of passages 33 and 34. The arcuate extent of the grooves 32 and 35 is obviously sufficient to enable the piston substantially completing its displacing movements and for obtaining the greatest efficiency from the air pumping unit. Egress of air from the groove 35 is through a duct 36 into an axial passage 37 in the shaft, the latter having radial ports 38 and a communicating peripheral groove 39 to facilitate the assemblage of the piston on the shaft.

The path of oil flow through the pump is from the engine crank case by way of the inlet oil passage 2, and through the inflow passage 40 in the mounting plate to inlet port 41 which opens into an annular groove 42 formed in the inner face of back plate 9. This groove is concentric with the axis of rotation and is in constant communication with an arcuate piston port 43 which delivers by a radial channel 44 into the chambers 26 and 27. The oil outflow is through a radial channel 45 and arcuate port 46 in the piston, a groove 47 and outlet port 48 in the back plate, and an outflow passage 49 in the mounting plate from which the companion outlet oil passage 2 leads to the engine bearings to be lubricated.

It will be apparent that the radial passages 44 and 45 will be closed to the further movement of oil therethrough whenever they wipe over the flat side walls 19 so that this action may be properly defined as a mechanical porting of the oil passages by the rotative piston. The air flow is also mechanically ported by this piston, and consequently the flow of both fluids through the pump will be under the control of the valving piston.

The clearance or fit between the relatively movable parts of the combined pump unit is sealed against air leakage by the oil being pumped, which oil also serves to lubricate the several sliding engagements. In the outlet passage from the air pumping unit, preferably in the axial bore 37, is a one-way check valve 50 which is yieldably held on its seat 51 by a spring 52, and beyond which the air is conveniently exhausted into the crank case through discharge port 54. This check valve will not only avoid a large part of the air exhaust noise but will also reduce the power required to operate the air pumping unit when the accessory is not in use because the high vacuum maintaining in either air chamber at the moment of maximum enlargement will tend to pull the piston thereinto and thereby ease the load on the power input through the driving shaft accordingly. The sliding contacts are without mechanical packing and do not require special packing since the pumped liquid will seep through the tolerances, which are incidental to commercial production, and seal them for all practical purposes. For this reason the pump parts may be economically produced by die casting or otherwise.

The several parts forming the pump casing are secured by suitable fastening means 54, and the combined pump unit mounted on the crank case by bolts 55. The vane, because of its greater capacity, is utilized for the displacement of the compressible fluid but obviously a reversal of this arrangement may be resorted to if desired. The piston of one pumping unit operates in a fluid chamber carried by the piston of the companion pumping unit to displace fluid from such chamber as well as to impart movement to such latter piston. This simplifies the combined pump unit and makes it compact for easy installation and practically efficient operation.

The suction line 6 is provided with a check valve 56 closing away from the pump under the urge of a spring 57. This check valve serves to prevent the sealing oil from being drawn up into the accessory line 6 when the pump comes to rest at which time the vacuum in the suction line is comparatively high. This is important in that it avoids any possible leakage from the suction line and further confines the sealing liquid to the pump.

It will be understood that the apparatus and system described and shown herein are merely illustrative of the inventive principles involved, which may be applied to other physical embodiments without departing from the scope and spirit of the invention claimed. It will also be noted that the leakage slip of sealing oil into the air chamber will improve the efficiency of the air pump, the excess sealing liquid being discharged back into the reservoir or crank case of the lubricating system.

I claim:

1. A combined liquid and gas pump unit comprising a chambered casing having gas inlet and outlet ports and liquid inlet and outlet ports separate and distinct from the gas ports, a piston reciprocable in the casing chamber between the end walls thereof for pumping one of the fluids and itself formed with an elongated chamber with its longitudinal dimension extending transversely to the path of reciprocation of the piston, a rotary piston mounted in the second chamber, the latter having opposing bearing surfaces engageable by the periphery of the rotary piston, means mounting the rotary piston for eccentric movement whereby its periphery will pump the other fluid and also act as a cam on the bearing surfaces to motivate the first piston in its fluid displacing movement, and means operable by and during movement of the rotary piston for operatively connecting the gas ports to one chamber and the liquid ports to the other chamber.

2. A combined liquid and gaseous pump comprising a casing having a chamber, an air displacing member slidable back and forth in the chamber between the side walls of the casing and itself formed with a relatively smaller chamber, a liquid displacing member rotatably mounted within the chamber about an eccentric axis and having its periphery displacing liquid therefrom intermediate the limits of movement of the air displacing member, said liquid displacing member operating about a transverse axis and having its liquid displacing periphery acting also in camming contact on the air displacing member to operate the latter between the extremities of the liquid displacing strokes whereby the direct power driving action of the liquid displacing member occurs on the compressible fluid at a time when the pumping action on the incompressible fluid is less than its maximum effort, and valved inlet and outlet means for each chamber, the inlet and outlet means for the liquid chamber being separate from and independent of the inlet and outlet means for the gas chamber.

3. A combined pump for displacing both liquid and gas, comprising a casing having a gas chamber, a gas displacing piston movable back and forth in the chamber and itself provided with a liquid chamber, a liquid displacing piston rotatable in the liquid chamber and journaled in the casing for eccentric movement, the periphery of the rotatable piston fitting between opposing wall portions of the liquid chamber with a line contact therewith for camming action to reciprocate the first piston, such periphery as it rotates in its eccentric path moving alternately into and out of the opposing chamber portions at opposite sides of its driving camming contact with the opposing wall portions of the liquid chamber to displace liquid from said opposing chamber portions, valved inlet and outlet means for the gas chamber, and valved inlet and outlet means for the liquid chamber independent of the gas inlet and outlet means to maintain the two fluids separate.

4. A combined pump for displacing both liquid and gas, comprising a casing having a gas chamber, a gas displacing piston movable back and forth in the chamber and itself provided with a liquid chamber, a liquid displacing piston rotatable in the liquid chamber and journaled in the casing for eccentric movement, the periphery of the rotatable piston fitting between opposing wall portions of the liquid chamber with a line contact therewith for camming action to reciprocate the first piston, such periphery as it rotates in its eccentric path moving alternately into and out of the opposing chamber portions at opposite sides of its driving camming contact with the opposing wall portions of the liquid chamber to displace liquid from said opposing chamber portions, the volumetric displacement of the gas displacing piston being relatively greater than the volumetric displacement of the liquid displacing piston, inlet and outlet means for the gas chamber, and inlet and outlet means for the liquid chamber separate from the gas inlet and outlet means to avoid commingling of the two fluids.

5. A combined pump for displacing both liquid and gas, comprising a casing having a gas chamber, a gas displacing piston movable back and forth in the chamber and itself provided with a liquid chamber, a liquid displacing piston rotatable in the liquid chamber and journaled in the casing for eccentric movement, the periphery of the rotatable piston fitting between opposing wall portions of the liquid chamber in camming contact therewith for reciprocating the first piston as it rotates in such liquid chamber, such periphery as it rotates in its eccentric path moving alternately into and out of the opposing chamber portions at opposite sides of its driving camming contact with the opposing wall portions of the liquid chamber to displace liquid from said opposing chamber portions, inlet and outlet ports for the liquid chamber, and inlet and outlet ports for the gas chamber separate and distinct from the liquid ports to avoid commingling of the liquid and gas, both sets of inlet and outlet ports opening through the casing to be opened and closed in order by the rotatable piston, the latter being provided with distributing passages for directing the gas and liquid into and out of their respective chambers during rotation of said rotatable piston.

6. A combined pump for displacing both liquid and gas, comprising a casing having a gas chamber, a gas displacing piston movable back and forth in the chamber and itself provided with a liquid chamber, a liquid displacing piston rotatable in the liquid chamber and journaled in the casing for eccentric movement, the periphery of the rotatable piston fitting between opposing wall portions of the liquid chamber in camming contact therewith for reciprocating the first piston as it rotates in such liquid chamber, such periphery as it rotates in its eccentric path moving alternately into and out of the opposing chamber portions at opposite sides of its driving camming contact with the opposing wall portions of the liquid chamber to displace liquid from said opposing chamber portions, inlet and outlet ports in the casing for the liquid chamber, and inlet and outlet ports in the casing for the gas chamber, said rotatable piston having distributing passages opening through one side face and adapted for connecting the gas inlet and outlet ports to the gas chamber in timed order, said rotatable piston also having distributing passages in its opposite side face and opening through the periphery for connecting the liquid chamber to the inlet and outlet ports thereof in timed order, the liquid distributing passages being separate from and of greater capacity than the gas distributing passages.

ANTON RAPPL.